(12) United States Patent
Harrison

(10) Patent No.: US 8,078,969 B2
(45) Date of Patent: Dec. 13, 2011

(54) USER INTERFACE FOR CREATING IMAGE COLLAGE

(75) Inventor: Jason F. Harrison, San Jose, CA (US)

(73) Assignee: Shutterfly, Inc., Redwood City, CA (US)

( * ) Notice: Subject to any disclaimer, the term of this patent is extended or adjusted under 35 U.S.C. 154(b) by 557 days.

(21) Appl. No.: 11/682,204

(22) Filed: Mar. 5, 2007

(65) Prior Publication Data

US 2008/0222560 A1 Sep. 11, 2008

(51) Int. Cl.
*G06F 3/00* (2006.01)
(52) U.S. Cl. ......... 715/732; 715/730; 715/838; 345/348
(58) Field of Classification Search ................. 715/730, 715/732, 838; 345/348, 838
See application file for complete search history.

(56) References Cited

U.S. PATENT DOCUMENTS

| | | | |
|---|---|---|---|
| 5,247,320 A | 9/1993 | Kay | |
| 5,867,282 A | 2/1999 | Fredlund | |
| 5,907,640 A | 5/1999 | Delean | |
| 5,918,213 A | 6/1999 | Bernard | |
| 5,926,288 A | 7/1999 | Dellert | |
| 5,960,411 A | 9/1999 | Hartman | |
| 6,005,482 A | 12/1999 | Moran | |
| 6,097,389 A * | 8/2000 | Morris et al. | 715/804 |
| 6,123,362 A * | 9/2000 | Squilla et al. | 283/67 |
| 6,133,985 A | 10/2000 | Garginkle | |
| 6,273,979 B1 | 8/2001 | Lastoria | |
| 6,281,872 B1 * | 8/2001 | Cariffe | 345/658 |
| 6,321,231 B1 | 11/2001 | Jebens | |
| 6,332,146 B1 | 12/2001 | Jebens | |
| 6,353,445 B1 | 3/2002 | Babula | |
| 6,374,260 B1 | 4/2002 | Hoffert | |
| 6,453,078 B2 * | 9/2002 | Bubie et al. | 382/305 |
| 6,954,282 B2 * | 10/2005 | Miyamoto et al. | 358/1.18 |
| 6,955,003 B1 | 10/2005 | Lew | |
| 7,010,176 B2 * | 3/2006 | Kusunoki | 382/299 |
| 7,277,192 B2 * | 10/2007 | Kotani et al. | 358/1.13 |
| 7,340,676 B2 * | 3/2008 | Geigel et al. | 715/716 |
| 7,522,174 B2 * | 4/2009 | Yamamoto et al. | 345/619 |
| 7,573,486 B2 * | 8/2009 | Mondry et al. | 345/619 |
| 7,576,755 B2 * | 8/2009 | Sun et al. | 345/629 |
| 7,668,400 B2 * | 2/2010 | Widdowson et al. | 382/276 |
| 7,689,915 B2 * | 3/2010 | Kitamaru et al. | 715/711 |

(Continued)

OTHER PUBLICATIONS

PhtoPlus 9.0 Companion; Serif (Europe) Ltd.; © 2003; 192 pages; http://www.serif.com/community/pdfs/PhP9companion.pdf.*

*Primary Examiner* — Steven P. Sax
*Assistant Examiner* — Linh Pham
(74) *Attorney, Agent, or Firm* — Xin Wen

(57) ABSTRACT

A user interface for a computer device includes an image collage layout including a plurality of image receiving areas each configured to receive an image, a first control configured to select a number of the image receiving areas in the image collage layout, a second control configured to select tilt angles of one or more of the image receiving areas in the image collage layout, a third control configured to select an amount of padding between the image receiving areas in the image collage layout, and a fourth control configured to select a width of a canvas border for the image receiving areas in the image collage layout, wherein the first control, the second control, the third control, and the fourth control are configured to be actuated by a user.

20 Claims, 9 Drawing Sheets

U.S. PATENT DOCUMENTS

| | | | |
|---|---|---|---|
| 2001/0035875 A1* | 11/2001 | Suzuki et al. | 345/723 |
| 2003/0160824 A1* | 8/2003 | Szumla | 345/769 |
| 2003/0202110 A1* | 10/2003 | Owens et al. | 348/222.1 |
| 2004/0017164 A1* | 1/2004 | Belliveau | 315/294 |
| 2005/0044485 A1* | 2/2005 | Mondry et al. | 715/502 |
| 2005/0134939 A1* | 6/2005 | Ikeda et al. | 358/471 |
| 2005/0210414 A1* | 9/2005 | Angiulo et al. | 715/838 |
| 2005/0216841 A1* | 9/2005 | Acker et al. | 715/730 |
| 2005/0235209 A1* | 10/2005 | Morita et al. | 715/716 |
| 2005/0246283 A1* | 11/2005 | Gwiazda et al. | 705/52 |
| 2005/0273470 A1* | 12/2005 | Heigold | 707/104.1 |
| 2006/0008175 A1 | 1/2006 | Tanakat | |
| 2006/0038897 A1* | 2/2006 | Sakimura et al. | 348/231.6 |
| 2006/0059426 A1* | 3/2006 | Ogikubo | 715/723 |
| 2006/0109283 A1* | 5/2006 | Shipman et al. | 345/629 |
| 2006/0181736 A1* | 8/2006 | Quek et al. | 358/1.18 |
| 2007/0143714 A1* | 6/2007 | Barbieri | 715/861 |
| 2007/0157084 A1* | 7/2007 | Yano et al. | 715/527 |
| 2007/0209003 A1* | 9/2007 | Obana et al. | 715/720 |
| 2007/0253028 A1* | 11/2007 | Widdowson | 358/1.18 |
| 2008/0075390 A1* | 3/2008 | Murai et al. | 382/284 |
| 2008/0247636 A1* | 10/2008 | Davis et al. | 382/152 |
| 2008/0304718 A1* | 12/2008 | Ryuto et al. | 382/118 |
| 2010/0223568 A1* | 9/2010 | Quek et al. | 715/765 |

* cited by examiner

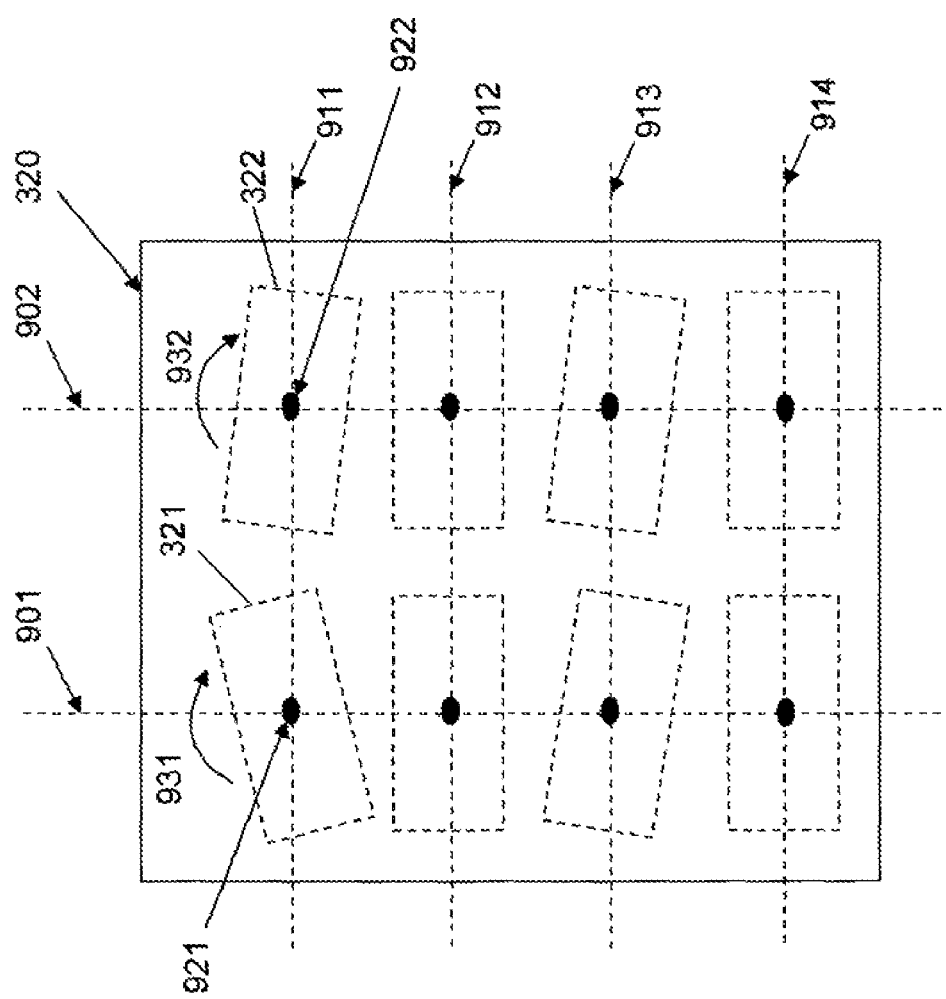

USER INTERFACE FOR CREATING IMAGE COLLAGE

BACKGROUND

In recent years, photography has been rapidly transformed from chemical based technologies to digital imaging technologies. Digital images captured by digital cameras can be stored in computers and viewed on electronic display devices. A user can upload digital images to a central network location provided by an image service provider such as Shutterfly, Inc. at www.shutterfly.com. The user can store, organize, manage, edit, enhance, and share digital images at the central network location using a web browser or software tools provided by the service provider. A user can also design and order image-based products from the image service provider. The image-based products can include image prints, photo books, photo calendars, photo greeting cards, holiday cards, photo mugs, and photo T-shirts using image content provided by the user. The image-based products can be created for the user or as photo gifts for others. A high degree of personalization is desirable in the image-based products to make them memorable to the users or to the photo gift recipients.

SUMMARY

In one aspect, the present application relates to a user interface for a computer device. The user interface includes an image collage layout including a plurality of image receiving areas each configured to receive an image, a first control configured to select a number of the image receiving areas in the image collage layout, a second control that can select tilt angles of one or more of the image receiving areas in the image collage layout, a third control that can select an amount of padding between the image receiving areas in the image collage layout, and a fourth control that can select a width of a canvas border for the image receiving areas in the image collage layout, wherein the first control, the second control, the third control, and the fourth control can be actuated by a user.

In another aspect, the present application relates to a computer device including a display device that can display a user interface comprising: an image collage layout including a plurality of image receiving areas each configured to receive an image, a first control that can select a number of the image receiving areas in the image collage layout, a second control that can select tilt angles of one or more of the image receiving areas in the image collage layout, a third control that can select an amount of padding between the image receiving areas in the image collage layout, and a fourth control that can select a width of a canvas border for the image receiving areas in the image collage layout. The first control, the second control, the third control, and the fourth control can be actuated by a user. The computer device also includes one or more input/output (I/O) devices that can be controlled by a user to control the first control, the second control, the third control, and the fourth control.

In another aspect, the present application relates to a computer device including a display device that can display a user interface comprising: an image collage layout including a plurality of image receiving areas each configured to receive an image, a first control that can select a number of the image receiving areas in the image collage layout, a second control that can select tilt angles of one or more of the image receiving areas in the image collage layout, a third control that can select an amount of padding between the image receiving areas in the image collage layout, and a fourth control that can select a width of a canvas border for the image receiving areas in the image collage layout. The first control, the second control, the third control, and the fourth control can be actuated by a user. The computer device also includes one or more input/output (I/O) devices that can be controlled by a user to control the first control, the second control, the third control, and the fourth control. The computer device can also include a computer memory configured to store a program that defines a plurality of grid points each defining a position for one of the image receiving areas in the image collage layout, wherein the program defines a tilt angle of an image receiving area about one of the plurality of grid points associated with the image receiving area in the image collage layout.

Implementations of the system may include one or more of the following. The second control can select a substantially the same tilt angle for all the receiving areas in the image collage layout. The second control can select different tilt angles for the receiving areas in the image collage layout. The second control can define a plurality of rows for the image receiving areas. The second control can define a plurality of columns for the image receiving areas. At least one of the first control, the second control, the third control, and the fourth control can include a tab slider having a slideable tab. The slidable tab can be slid by a user to select the number or the tilt angles of the image receiving areas, or the amount of padding between the image receiving areas, or the width of a canvas border for the image receiving areas in the image collage layout. The user interface can further include an image collection configured to display a plurality of images that are configured to be moved to the image receiving areas in the image collage layout. The image collage layout can be displayed by a computer device and data for the image collage layout is received from a remote server relative to the computer device. The first control, the second control, the third control, and the fourth control can be controllable by a user through the remote server.

Embodiments may include one or more of the following advantages. The disclosed systems and methods allow a user to create image collages in many different layouts, different formats, and different styles. The disclosed systems and methods also provide an intuitive user interface for creating image collages. A user can make global changes to the image collage as well as local changes that impact only to individual images in an image collage. A user can flexibly control a large of number of design variables for the image collages such as the number of images, the number of rows and columns, the canvas border for the images, and the padding between the images in the image collage. A user can also easily adjust the tilt orientation for individual images in the image collage.

BRIEF DESCRIPTION OF THE DRAWINGS

FIG. 9 illustrates an algorithmic framework that enables flexible control of the image collage layout in FIG. 3.

Although the invention has been particularly shown and described with reference to multiple embodiments, it will be understood by persons skilled in the relevant art that various changes in form and details can be made therein without departing from the spirit and scope of the invention.

DETAILED DESCRIPTION

Figure 1:
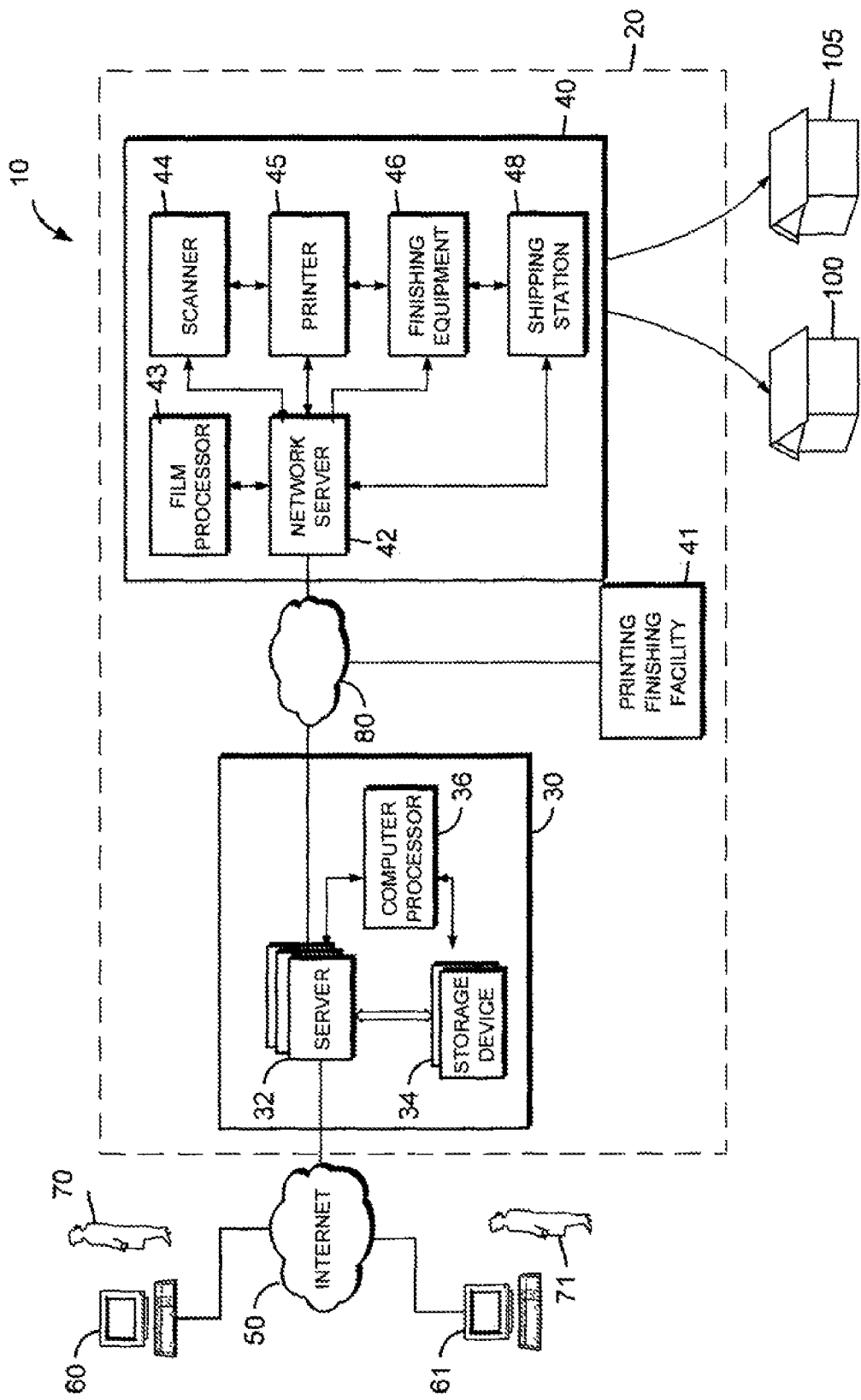
FIG. 1 is a block diagram of a system for producing personalized image-based products.

FIG. 1 shows a block diagram of a system 10 for producing personalized image-based products. An online photo system 20 can be established by an image service provider to provide image services and products on a wide area network such as the Internet 50. The online photo system 20 can include a data center 30, one or more printing and finishing facilities 40 and 41, and a computer network 80 that can facilitate the communications between the data center 30 and the finishing facilities 40 and 41.

In the present specification, the term "personalized" is used in personalized content, personalized messages, personalized images, and personalized designs that can be incorporated in the personalized products. The term "personalized" refers to the information that is specific to the recipient, the user, the gift product, or the intended occasion. The content of personalization can be provided by a user or selected by the user from a library of content provided by the image-server provided. The content provided can include stock images and content licensed from a third party. The term "personalized information" can also be referred to as "individualized information" or "customized information". Examples of personalized image-based products may include personalized photo greeting cards, photo prints, photo books, photo T-shirt, and photo mugs etc. The personalized image-based products can include users' photos, personalized text, and personalized designs.

The term "photo book" refers to books that include one or more pages and at least one image on a book page. A photo books can include a photo albums, a scrapbook, a photo calendar book, or a photo snapbook, etc. The photo book in the disclosed system can include personalized image and text content provided by a user or by a third party. A "photo-book kit" in the disclosed system refers to a photo book comprising personalized content as described above, as well as one or more book accessories such as a slip case for a book, a book insert such as a bookmark, and a dust jacket. The "photo-book kit" in the disclosed system can include personalized content on the book pages, the book cover, and the book accessories.

The data center 30 can include one or more servers 32, data storage devices 34 for storing image data, user account and order information, and one or more computer processors 36 for processing orders and rendering digital images. An online-photo website can be powered by the servers 32 to serve as a web interface between the users 70 and the image service provider. The users 70 can order image-based products from the web interface. The printing and finishing facilities 40 and 41 can produce the ordered image-based products such as photographic prints, greeting cards, holiday cards, post cards, photo albums, photo calendars, photo books, photo T-shirt, photo mugs, photo aprons, image recording on compact disks (CDs) or DVDs, and framed photo prints.

The architecture of the data storage devices 34 is designed to optimize the data accessibility, the storage reliability and the cost. Further details on the image data storage in online photo system 20 are provided in the commonly assigned U.S. Pat. No. 6,839,803, titled "Multi-Tier Data Storage System", which is incorporated herein by reference.

The printing and finishing facilities 40 and 41 can be co-located at the data center 30. Alternatively, the printing and finishing facility 40 and 41 can be located remotely from the data center 30. The printing and finishing facility 40 and 41 can be set up. Each printing and finishing facility 40 or 41 can be geographically located close to a large population of customers to shorten order delivery time. Furthermore, the printing and finishing facilities 40 and 41 and the data center 30 can be operated by different business entities. For example, a first business entity can own the data center 30 and host the website that can be accessed by the users 70. The printing and finishing facilities 40 and 41 can be owned and operated by a second business entity, which can be referred as an Application Service Provider (APS), responsible for fulfilling the image-based products ordered through at the website.

The printing and finishing facility 40 can include one or more network servers 42, printers 45 for printing images on physical surfaces, finishing equipment 46 for operations after the images are printed, and shipping stations 48 for confirming the completion of the orders and shipping the ordered image-based products to the user 70 or recipients 100 and 105. The one or more network servers 42 can communicate with the data center 30 via the computer network 80 and facilitate the communications between different devices and stations in the printing and finishing facility 40. The computer network 80 can include a Local Area Network, a Wide Area Network, and wireless communication network.

The printers 45 can receive digital image data and control data, and reproduce images on receivers. The receivers can be separate photo prints, or pages to be incorporated into photo books. Examples of the printers 45 include can be digital photographic printers such as Fuji Frontier Minilab printers, Kodak DLS minilab printers, Imaging Solutions CYRA Fast-Printing digital photo printer, or Kodak I-Lab photo printers. The printers 45 can include offset digital printers or digital printing presses such as HP Indigo digital printing press. Xerox's iGen printer series, etc. The printers 45 can also include large format photo or inkjet printers for printing posters and banners. The printing and finishing facilities 40 and 41 can include a film processor 43 for processing exposed films, and a scanner 44 for digitizing processed film stripes. The order information and image data can be transferred from servers 32 to the network servers 42 using a standard or a proprietary protocol (FTP, HTTP, among others).

The finishing equipment 46 can perform operations for finishing a complete image-based product other than printing, for example, cutting, folding, adding a cover to photo book, punching, stapling, gluing, binding, envelop printing and sealing, packaging, labeling, package weighing, and postage metering. The finishing operations can also include framing a photo print, recording image data on a CD-ROM and DVD, making photo T-shirts and photo mugs, etc. Furthermore, the printers 45 and the finishing equipments 46 can reside at different locations.

Figure 2:
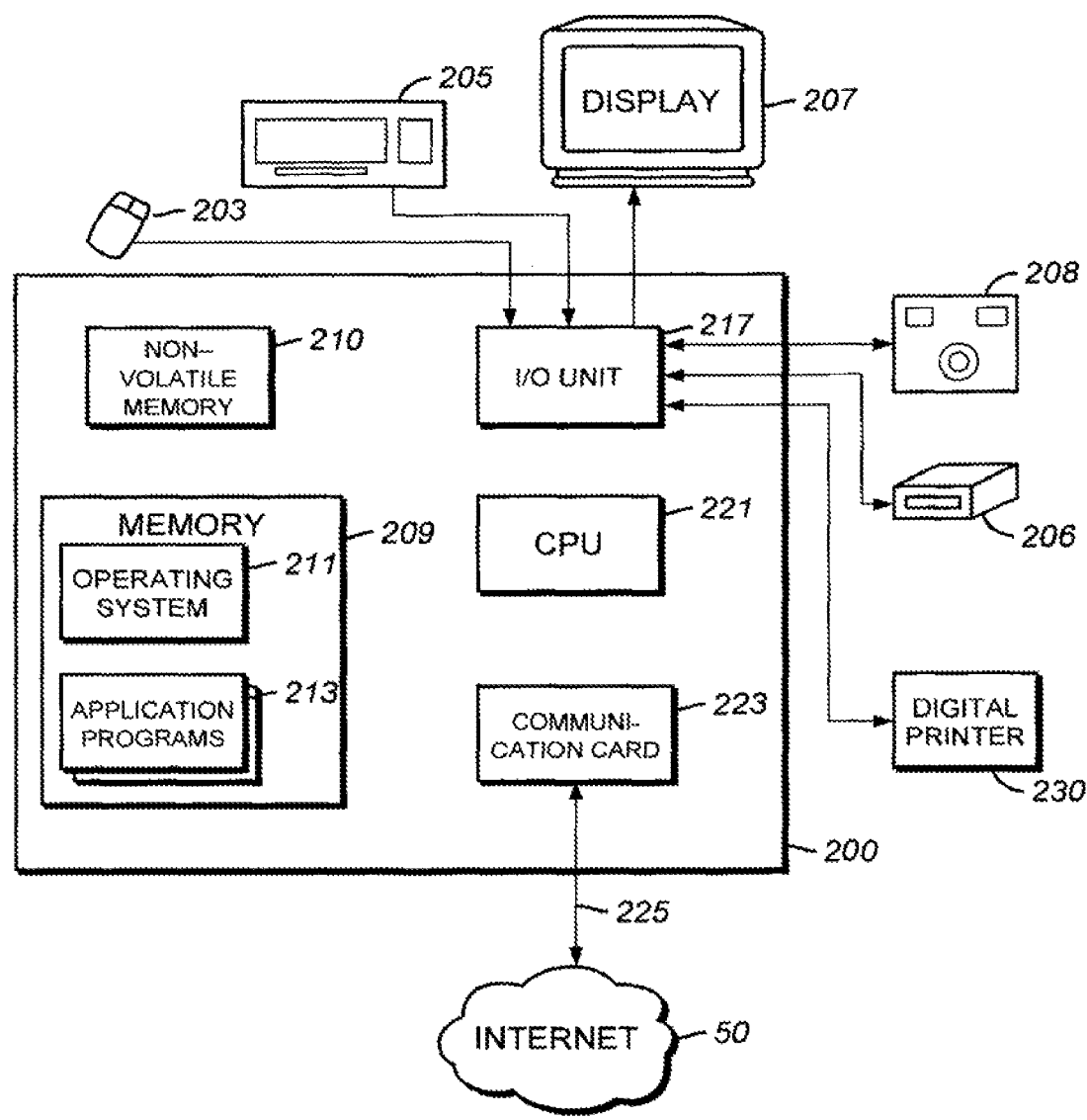
FIG. 2 shows a typical user's computer used with the system of FIG. 1.

A user 70 can access the online-photo website using a computer terminal 60 as shown in FIG. 1. The computer terminal 60 can be a personal computer, a portable computer device, or a public entry terminal such as a kiosk. The computer terminal 60 allows a user 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer terminal 60, shown in FIG. 2, include input/output (I/O) devices (mouse 203, keyboard 205, display 207) and a general purpose computer 200 having a central processor unit (CPU) 221, and I/O unit 217 and a memory 209 that stores data and various programs such as an operating system 211, and one or more application programs 213 including applications for viewing, managing, and editing digital images (e.g., a graphics program such as Adobe Photoshop). The computer 200 also includes non-volatile memory 210 (e.g., flash RAM, a hard disk drive, and/or a USB memory card, floppy disk, a CD-ROM, a DVD, or other removable storage media), and a communications device 223 (e.g., a modem or network adapter) for exchanging data with an Internet 50 via communications link 225 (e.g., a telephone line).

The computer 200 allows the user 70 to communicate with the online-photo website using the wired or wireless communication card or device 223. The user 70 can set up and access her personal account. The user 70 can enter user account information such as the user's name, address, payment information (e.g. a credit card number), and information about the recipient of the image-based products. The user 70 can also enter payment information such as credit card number, the name and address on the credit card etc. The user 70 can upload digital images to the online-photo website. The user can store the images in an online photo album, create personalized image-based product at the web user interface, and order a personal image-based product and a gift product for specified recipients 100 and 105.

The computer 200 can be connected to various peripheral I/O devices such as an image capture device (digital camera, film scanner or reflective scanners). The peripheral device can be a digital camera 208. The digital images captured by a digital camera are typically stored in a memory card or a memory stick (e.g., SmartMedia™ or CompactFlash™) that are detachable from the digital camera. The digital images on the memory card can be transferred to o a non-volatile memory 210 using a card reader 206. The digital camera 208 can also be directly connected to the computer 200 using a Firewire or an USB port, a camera docking station, or a wireless communication port to allow digital images to be transferred from the memory on the detail camera to the computer's disk drive or the non-volatile memory 210.

The user 70 can also obtain digital images from film-based prints from a traditional camera, by sending an exposed film into a photo-finishing service, which develops the film to make prints and/or scans (or otherwise digitizes) the prints or negatives to generate digital image files. The digital image files then can be downloaded by the user or transmitted back to the user by e-mail or on a CD-ROM, diskette, or other removable storage medium. The users can also digitize images from a negative film using a film scanner that is connected to the computer 200 or from a reflective image print using a scanner. Digital images can also be created or edited using an image software application 213 such as Adobe Photoshop.

Once the digital images are stored on the computer 200, a user can perform various operations on the digital images using application programs 213 stored in memory 209. For example, an image viewer application can be used for viewing the images and a photo editor application can be used for touching up and modifying the images. An electronic messaging (e.g., e-mail) application can be used to transmit the digital images to other users. The application programs 213 can also enable the user 210 to create a personalized image-based product on the computer 200. Several of the above described imaging functions can be incorporated in a client software application that can be installed on a user's computer 200.

In addition to viewing the digital images on the computer display 207, the user 70 may desire to have physical image-based products made of digital images. Prints can be generated by the user 70 using a digital printer 230 that is connected to the computer 200. Typical digital printers 230 can include such as an inkjet printer or a dye sublimation printer. The user 70 can also purchase image-based products from the online image service provider. The production of these image-based products often require the use of commercial equipment which are usually only available at a commercial production location such as the printing and finishing facilities 40 and 41. An example for the online image service providers is Shutterfly, Inc., located at Redwood City, Calif.

The user 70 can be consumer that accesses the computer terminal 60 from home or a public entry terminal. The user 70 can also be a business owner or employee that may access the computer terminal 60 at a retail location such as a photo shop or a printing store. The disclosed system is compatible with a retail imaging service using a local computer 200 at the point of sales, or an online photo system wherein a user 70 access a server 32 using a remote computer terminal 60. The formats of communication between the computer terminal 60 and the servers 32 as well as the graphic user interface can be customized for the consumer and commercial customers.

The computer terminal 60 can also be a public entry terminal such as a kiosk for receiving digital image data from the user 70 and uploading the digital images to the server 32. After the digital image files have been uploaded, the user can view, manipulate and/or order prints in the manners described above. The public entry terminal can also support various electronic payment and authorization mechanisms, for example, a credit or debit card reader in communication with a payment authorization center, to enable users to be charged, and pay for, their prints at the time of ordering.

An exemplified process of using the online image service can include the following. The user 70 sends digital images to the servers 32 provided by the online photo system 20 by uploading over the Internet 50 using a standard or a proprietary protocol (FTP, HTTP, XML, for example) of electronic communication application (for example, e-mail or special-purpose software provided by the photo-finisher). The user 70 can also send digital image data stored on an electronic storage medium such as a memory card or recordable CD by US mail, overnight courier or local delivery service. The photo-finisher can then read the images from the storage medium and return it to the user, potentially in the same package as the user's print order. The image service provider can load data or programs for the user's benefit onto the storage medium before returning it to the user. For example, the photo-finisher can load the storage medium with an application program 213 for the user to create a personalized image-based product on his computer 200.

The user 70 can also send a roll of exposed film, and processed film negatives to the image service provider. The exposed film is processed by the film processor 43 and digitized by the scanner 44 in the printing and finishing facilities 40 and 41. The digital image data output from the scanner 44 is stored on the data storage 34.

After the image service provider has received the user's digital images, the image service provider can host the images on the online photo website, at which the user can view and access the images using a web browser or a locally installed software application. The user 70 can access the online-photo website to create and design a photo-based product such as a photo book and a photo greeting card, and specify the images to be reproduced on an image-based product and parameters relating to printing (e.g., finish, size, number of copies). The user 70 can also designate one or more recipients 100 and 105 to whom the image-based products are to be sent.

After the user's images have reached the image service provider and have been made available online, the user can place an order with the image service provider. One way to place an order is by having the user 70 view the images online, for example, with a browser and selectively designate which images should be printed. The user can also specify one or more recipients 100 and 105 to whom prints should be distributed and, further, print parameters for each of the individual recipients, for example, not only parameters such as the size, number of copies and print finish, but potentially also custom messages to be printed on the back or front of a print. The user 70 can also authorize a recipient 110 to receive the user's images electronically by entering the recipient 110's email address and other electronic identifications.

The information entered by the user 70 can be stored on the server 32 and the data storage 34, and subsequently transmitted to a printing and finishing facility 40 or 41 for making the image-based products. The image-based products can include photographic prints, but also any other item to which graphical information can be imparted, for example, greeting or holiday cards, books, greeting cards, playing cards, T-shirts, coffee mugs, mouse pads, key-chains, photo collectors, photo coasters, or other types of photo gift or novelty item. The image-based products are printed by the printer 45 and finished by finishing equipment 46 according to the printing parameters as specified by the user 70. The image-based products are then delivered to the specified recipients 100 and 105 using standard U.S. Mail, or courier services such as Federal Express and UPS.

Figure 3:
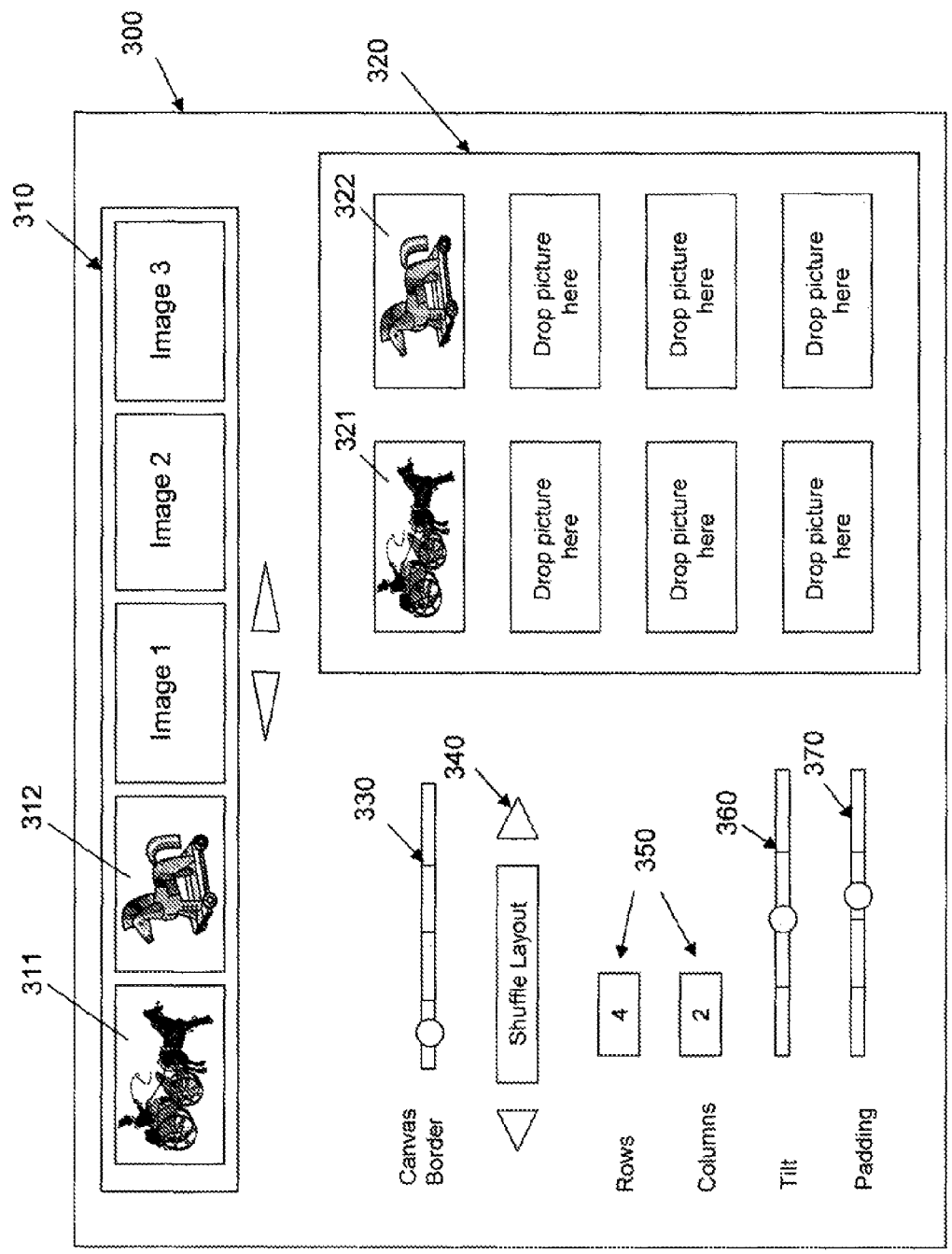
FIG. 3 illustrates an exemplified user interface for creating an image collage.

A user interface 300 is shown in FIG. 3. The user interface 300 can be implemented on a display 207 in connection with the computer 200 (FIG. 2), or computer terminals 60 and 61 (FIG. 1). The user interface 300 can include a user interface for communicating with a local program running on the computer 200. The user interface 300 can include a web user interface that allows the user 70 to communicate with the server 32 in the data center 30.

The user interface 300 includes an image collection area 310 that include a plurality of images 311, 312. The images can be selected by arrow buttons 315. Different sets of images 311, 312 can be brought into view in the user interface 300 using the arrow buttons 315. The user interface 300 also includes an image collage layout 320 that includes a plurality of image receiving areas 321, 322 that represent the locations and the dimensions of the images to be placed in the image collage defined by the image collage 320. In the present specification, an image collage refers to a page that includes plurality of images. The page can also include a background image and text. The background image can provide a theme or style to the image collage. The images can be distributed in different patterns. The text can be by the side of or inside the images.

The user interface 300 includes one or more controls 350 for the user 70 to select the number of image receiving areas 321, 322 and their distributions in the image layout 320. For example, the image receiving areas 321, 322 can be arranged in rows and columns. The controls 350 can include cells for a user to enter the number of rows and columns of the image receiving areas 321, 322 in the image collage layout 320. In another example, the controls 350 can define the number of images distributed on a curved line or a circle. In another example, the image receiving areas 321, 322 can be randomly positioned by a program preinstalled in the computer. The user can select the number of image receiving areas 321, 322 in the image collage layout 320. In another example, the image receiving areas 321, 322 can be arranged other periodic or aperiodic patterns.

A user can input/output device to move the images 311, 312 to the image receiving areas 321, 322. For example, the user 70 can use a mouse to drag the images 311, 312 and drop them to the image receiving areas 321, 322. The number of image receiving areas 321, 322 can be changed using controls 350 after the placement of images 311, 312 in the image receiving areas 321, 322. The images 311, 312 placed at the image receiving areas 321, 322 can be repositioned automatically with their corresponding image receiving areas 321, 322 in accordance with changes in the image collage layout 320.

Figure 4:
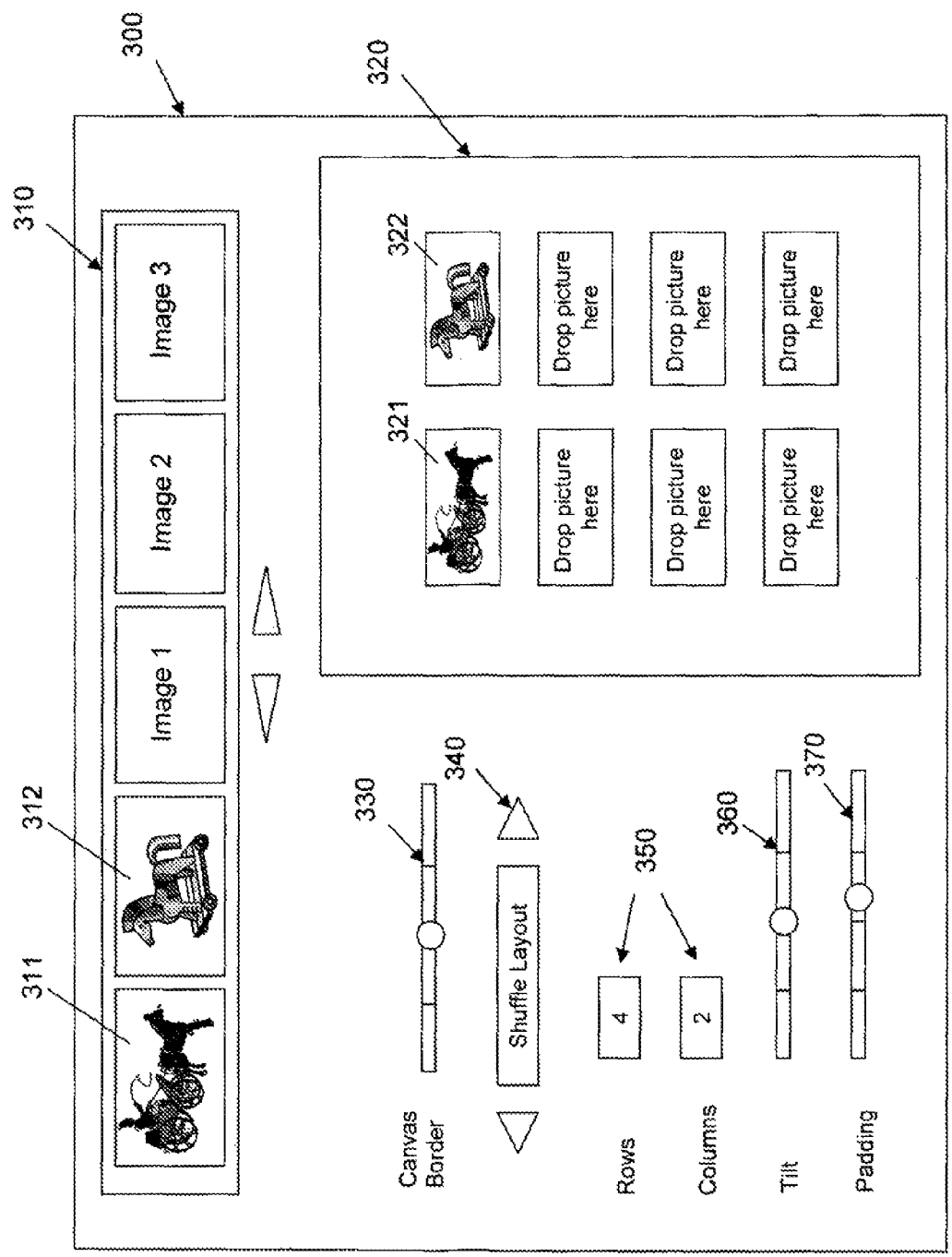
FIG. 4 illustrates the user interface of FIG. 3 after an increase in the canvas border in the image collage.

The user interface 300 includes a control 330 for controlling the width of a canvas border for the image collage layout 320. The control 330 can be intuitively implemented as a tab slider. A user can conveniently slide a tab along the slider to control 330 to vary the canvas border for the image collage. For example, the canvas border is increased after a tab in the control 330 is slided to the right, as shown in FIG. 4.

Figure 5:
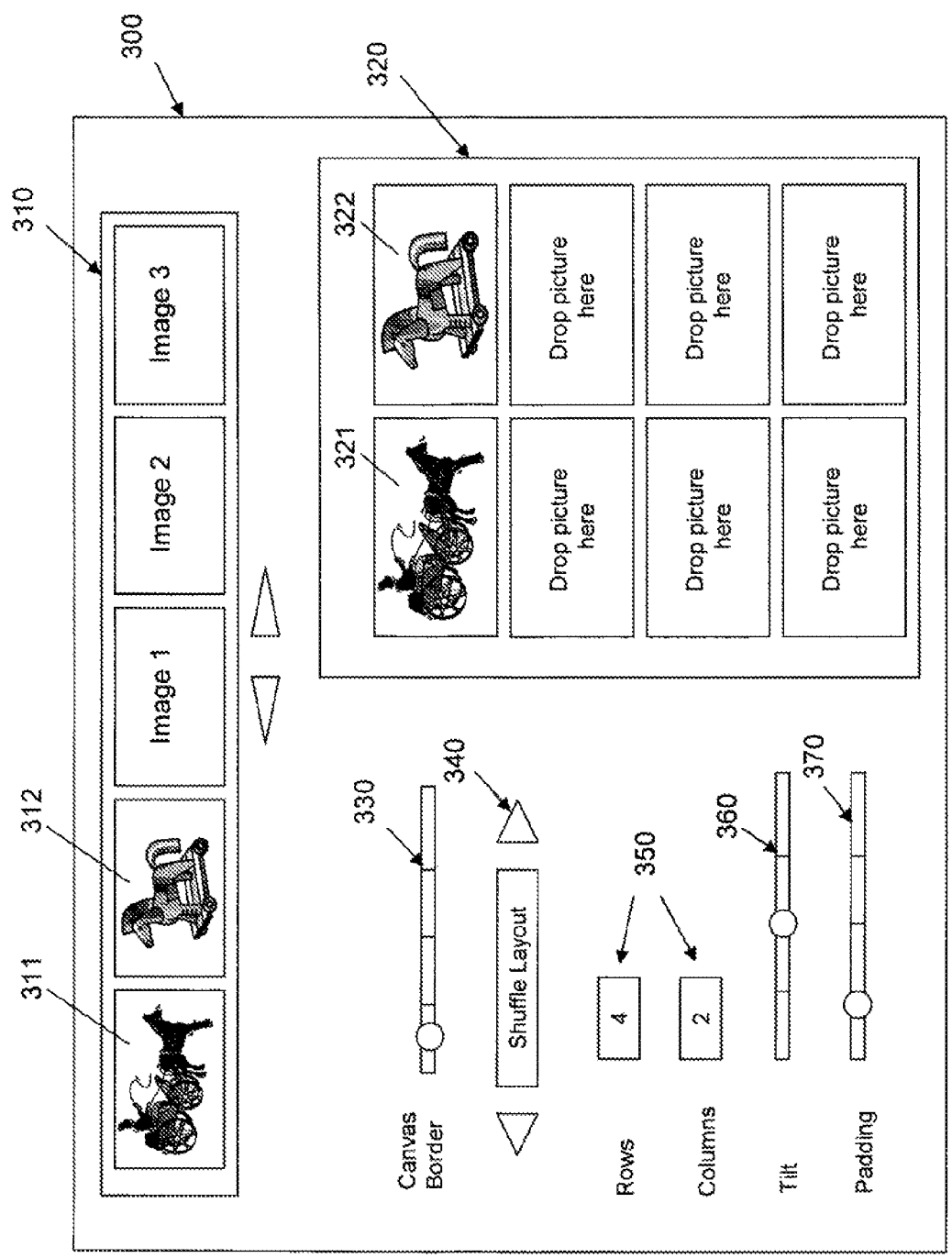
FIG. 5 illustrates the user interface of FIG. 3 after a decrease in the padding between the images in the image collage.

The user interface 300 includes a control 370 for controlling the amount of padding between the images in the image receiving areas 321, 322 in the image collage layout 320. The control 370 can also be intuitively implemented as a tab slider. A user can conveniently slide a tab in the control 370 to vary the amount of padding between the image receiving areas 321, 322 in the image collage layout 320. For example, the amount of padding (or the gaps) between the images is decreased after a tab in the control 370 is slided to the left, as shown in FIG. 5.

Figure 6:
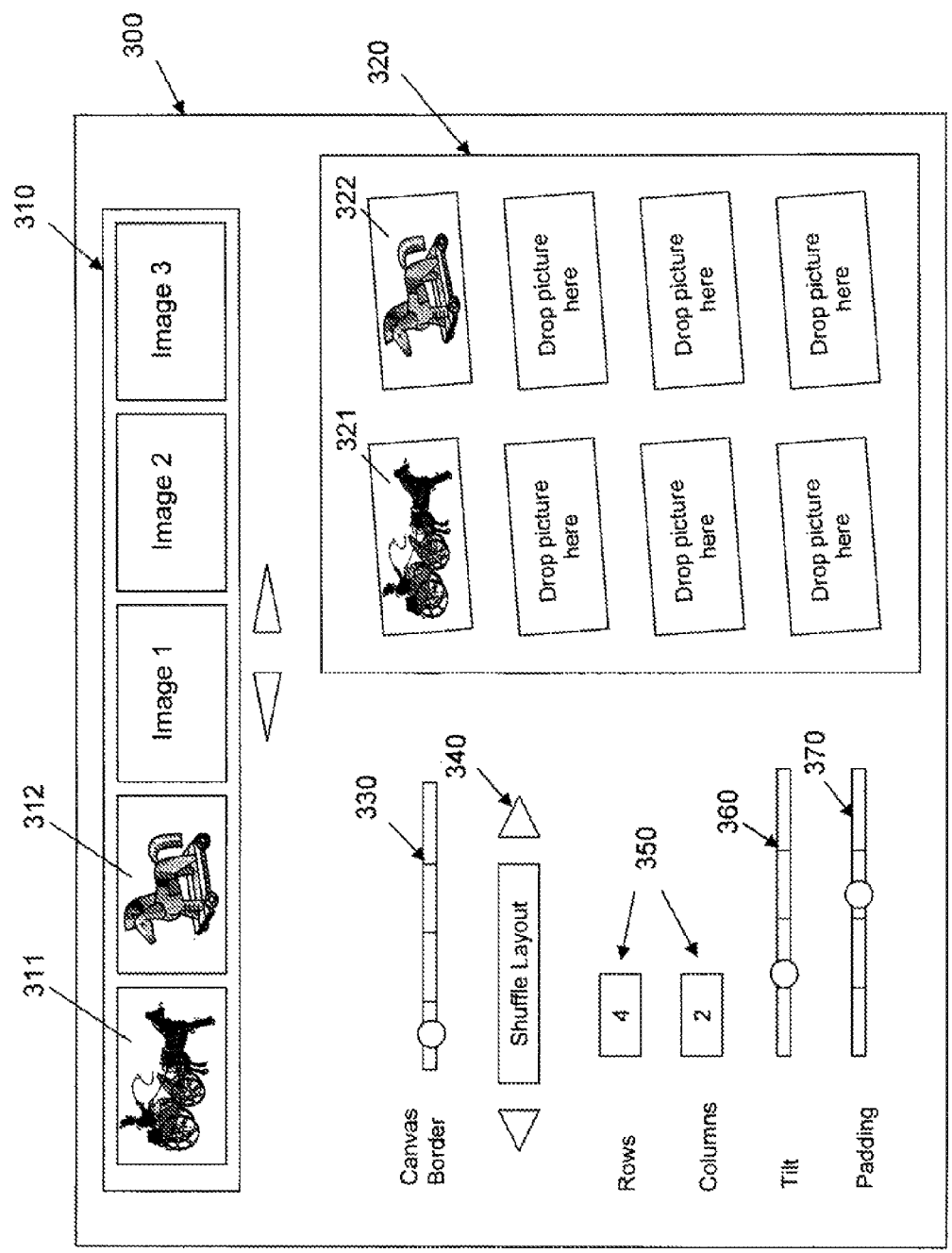
FIG. 6 illustrates the user interface of FIG. 3 after the images in the image collage are tilted to the left.
Figure 7:
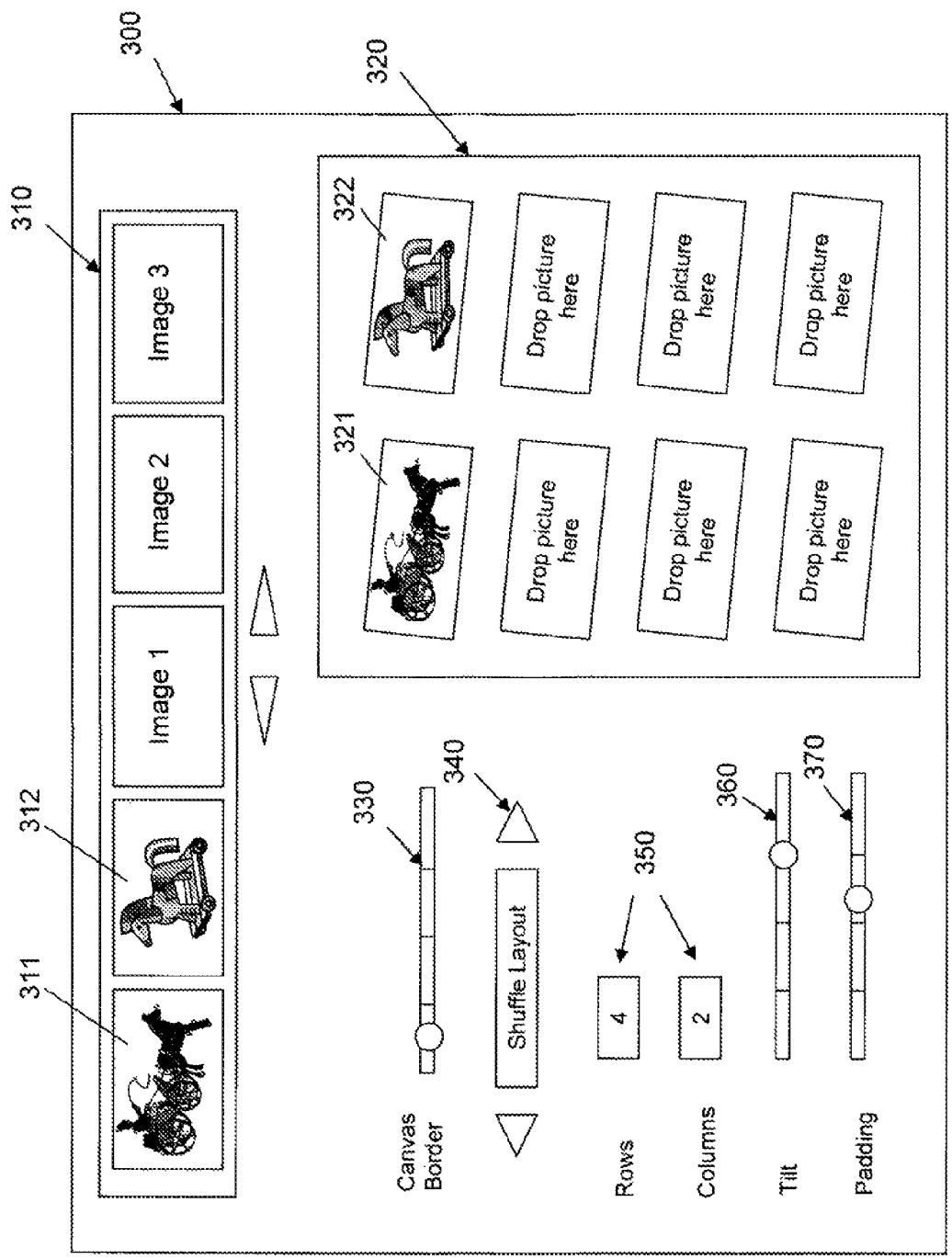
FIG. 7 illustrates the user interface of FIG. 3 after the images in the image collage are tilted to the right.
Figure 8:
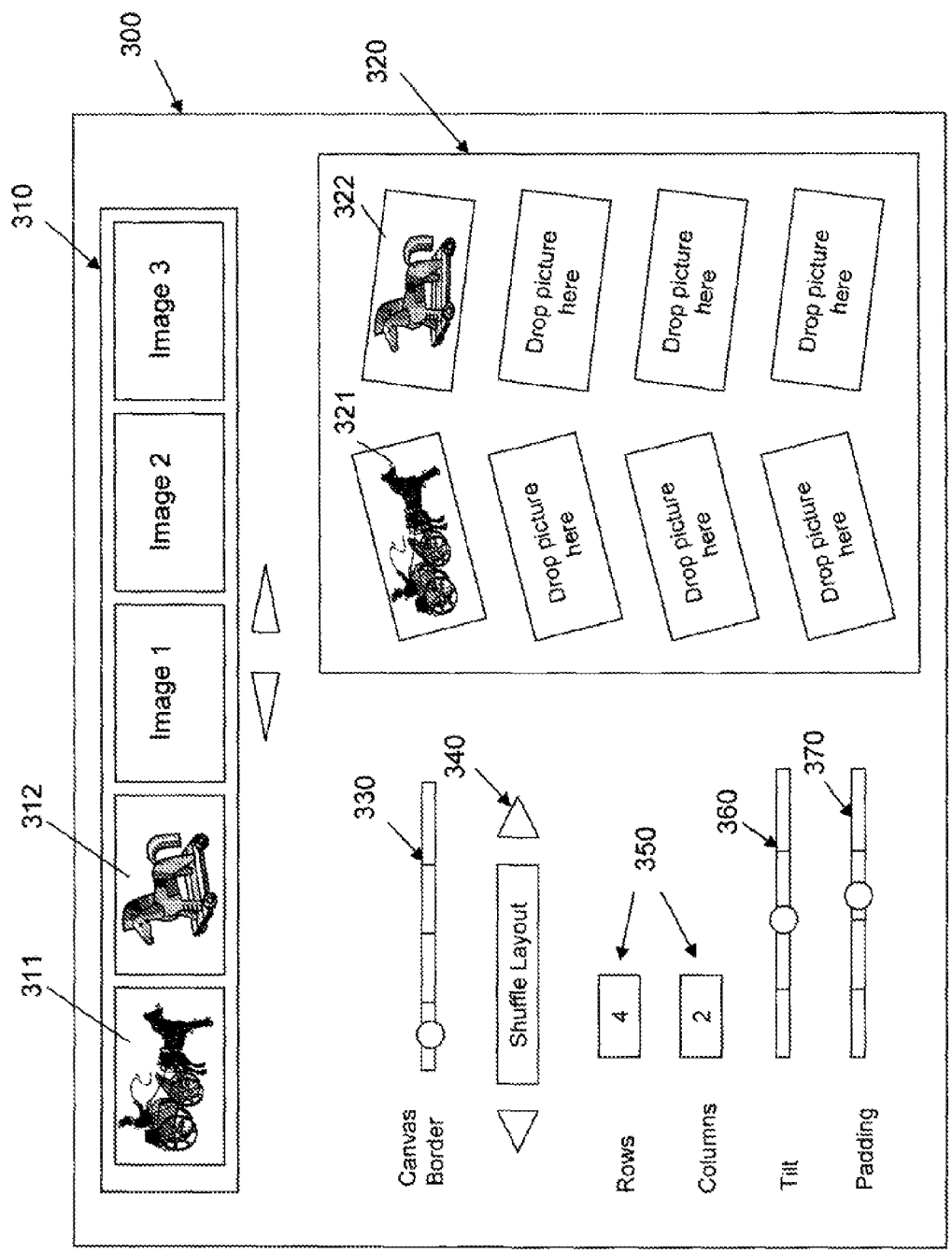
FIG. 8 illustrates the user interface of FIG. 3 after the images in the image collage are tilted to different directions.

The user interface 300 includes a control 360 for controlling the tilt angles of the images in the image collage layout 320. The control 360 can also be intuitively implemented as a tab slider. A user can conveniently slide a tab along the slider to control 360 to tilt the images in the image collage layout 320 to the left, as shown in FIG. 6, and to the right, as shown in FIG. 7. The user interface 300 can also allow the images in the image collage layout 320 to tilt in different directions, as shown in FIG. 8. A user can use a control 340 to select different tilt configurations and layout for the images (or the image receiving areas 321, 322) in the image collage layout 320. For example, user can use the control 340 to tilt a portion of the image receiving areas 321, 322 while keeping the other image receiving areas 321, 322 at un-tilted positions.

A user can control the control 330-370 using an input/output (I/O) device 203 such as a computer mouse, a keyboard, a touch screen, a stylus pen, or an voice recognition system.

The disclosed systems and methods allow a user to conveniently and flexibly change the layout of an image collage. A user can make global changes to all the images such as a change in the canvas border or a uniform tilt to all the images in the image collage layout. The images in the image collage layout can also be individually changed. FIG. 9 illustrates an algorithmic framework that enables such flexible control of the image collage layout by a user. The positions of the image receiving areas 321, 322 in the image collage layout 320 can be defined by a plurality of grid points 921, 922. The grid points 921, 933 are typically within the boundaries of their respective image receiving areas 321, 322. For example, the grid points 921, 922 can be situated at the geometric centers of their respective image receiving areas 321, 322. The grid points 921, 922 can also define centers of rotation for their respective image receiving areas 321, 322. For example, the image receiving area 321 can rotate around the grid point 921 in the direction 931. The image receiving area 322 can rotate around the grid point 922 in the direction 932. The image receiving areas 321, 322 can be tilted to different directions as defined by the grid points 921, 922. The grid points 921, 922 can be disposed in a periodic pattern or non periodic locations depending on the style of the image collage layout 320. For example, the grid points 921, 922 can be positioned on the cross pints of a plurality of horizontal lines 911-914 and a plurality of vertical lines 901, 902. The number of and the spacing between the horizontal lines 911-914 or the vertical lines 901, 902 can be adjusted according to the design of the image collage layout 320.

In some embodiments, a program stored in the memory 209 or the non-volatile memory 210 can be run by the CPU 221 to define the user interface 300 and the image collage layout 320 on the display 207. The program can also define the grid points 921, 922 and adjustment operations that can be applied to the grid points 921, 922. In some embodiments, a program can be stored and ran on remote servers to support the user interface 300 as a web user interface via the Internet 50 and a communication device in the computer 200.

It is understood that the above disclosed system and methods can be implemented in various forms without deviating from the spirit of the specification. For instance, more than one user can be involved in the image collage. The images in the image collage can have shapes other than rectangles as illustrated in the drawings. The images in the image collage can be positioned not in parallel rows or parallel columns. Text or image caption can be added inside or outside of the images in the image collage layout. Background image or designs can be included in the image collage layout. The user interface can include controls for receiving the text information and for selecting or creating the background images or designs. The images can be provided by a user or by an image service provider. The images can include computer graphics and clipart images. The images in the image receiving areas can be exchanged or moved back to the image collection in the user interface.

What is claimed is:

1. A method for allowing a user to manipulate images at a user interface on a computer device, comprising:
    displaying a plurality of image receiving areas in the image collage layout at a user interface on a computer device, wherein the plurality of image receiving areas comprise a first group of image receiving areas and a second group of image receiving areas, wherein each of the plurality of image receiving areas is configured to receive and display an image;
    allowing a user to select a first tilt angle for the first group of image receiving areas;
    displaying the first group of the image receiving areas at the first tilt angle in the image collage layout at the user interface;
    allowing the user to select a second tilt angle for the second group of image receiving areas; and
    displaying the second group of the image receiving areas at the second tilt angle in the image collage layout at the user interface, wherein the user interface comprises at least one control configured to allow the user to continuously vary the first tilt angle and the second tilt angle, wherein the at least one control comprises a first slideable tab and one of a second slideable tab or a third slideable tab at the user interface, wherein the first slidable tab is configured to be slided by a user to select the first tilt angle and the second tilt angle, wherein the second slidable tab is configured to adjust the amount of padding between the plurality of image receiving areas, and the third slideable tab is configured to adjust the width of a canvas border for the image receiving areas in the image collage layout are adjustable by the user at the user interface, wherein the plurality of image receiving areas are positioned at a plurality of grid points on the user interface, wherein each of the grid points defines a center of rotation for the image receiving area located at the respective grid point.

2. The method of claim 1, wherein the first tilt angle and the second tilt angle have substantially the same angle.

3. The method of claim 1, wherein the first tilt angle and the second tilt angle have different angle.

4. The method of claim 1, wherein the first tilt angle and the second tilt angle define image rotations toward the same direction.

5. The method of claim 1, wherein the first tilt angle and the second tilt angle define image rotations toward opposite directions.

6. The method of claim 1, wherein the first group of image receiving areas is positioned in a row or a column in the user interface.

7. The method of claim 1, wherein the plurality of image collage layouts is displayed in response to data received from a server remotely located relative to the computer device.

8. The method of claim 1, wherein the plurality of grid points at the geometric centers of the respective image receiving areas.

9. A method for allowing a user to manipulate images at a user interface on a computer device, comprising:
    displaying a plurality of image receiving areas in the image collage layout at a user interface on a computer device, wherein each of the plurality of image receiving areas is configured to receive and display an image;
    allowing a user to select the amount of space between adjacent image receiving areas in the plurality of image receiving areas in the image collage layout;
    displaying the plurality of image receiving areas having the selected amount of space by the user in the image collage layout at the user interface;
    allowing the user to select a tilt angle for the plurality of image receiving areas according to the selected amount of space between the adjacent image receiving areas; and
    displaying the plurality of image receiving areas having the selected amount of space and oriented at the selected tilt angle in the image collage layout at the user interface, wherein the user interface comprises at least one control configured to allow the user to continuously vary the first tilt angle and the second tilt angle, wherein the at least one control comprises a first slideable tab and one of a second slideable tab or a third slideable tab at the user interface, wherein a first slidable tab is configured to be slided by a user to select the first tilt angle and the second tilt angle, wherein the second slidable is configured to adjust the amount of padding between the plurality of image receiving areas, and the third slideable tab is configured to adjust the width of a canvas border for the image receiving areas in the image collage layout are adjustable by the user at the user interface, wherein the plurality of image receiving areas are positioned at a plurality of grid points on the user interface, wherein each of the grid points defines a center of rotation for the image receiving area located at the respective grid point.

10. The method of claim 9, wherein the plurality of image receiving areas are tilted at the tilt angle such that the adjacent image receiving areas do not touch or overlap with each other.

11. The method of claim 9, wherein the user interface comprises a first control configured to allow the user to vary the tilt angle.

12. The method of claim 9, wherein the user interface comprises a second control configured to allow the user to vary the amount of space between the adjacent image receiving areas.

13. The method of claim 9, wherein the first group of image receiving areas is positioned in a row or a column in the user interface.

14. A computer program product comprising a non-transitory computer useable medium having computer readable program code functions embedded in said medium for causing a computer to:
   display a plurality of image receiving areas in the image collage layout at a user interface on a computer device, wherein the plurality of image receiving areas comprise a first group of image receiving areas and a second group of image receiving areas, wherein each of the plurality of image receiving areas is configured to receive and display an image;
   allow a user to select a first tilt angle for the first group of image receiving areas in the image collage layout;
   display the first group of the image receiving areas at the first tilt angle in the image collage layout at the user interface;
   allow the user to select a second tilt angle for the second group of image receiving areas in the image collage layout; and
   display the second group of the image receiving areas at the second tilt angle in the image collage layout at the user interface, wherein the user interface comprises at least one control configured to allow the user to continuously vary the first tilt angle and the second tilt angle, wherein the at least one control comprises a first slideable tab and one of a second slideable tab or a third slideable tab at the user interface, wherein a first slidable tab is configured to be slid by a user to select the first tilt angle and the second tilt angle, wherein the second slidable is configured to adjust the amount of padding between the plurality of image receiving areas, and the third slideable tab is configured to adjust the width of a canvas border for the image receiving areas in the image collage layout are adjustable by the user at the user interface, wherein the plurality of image receiving areas are positioned at a plurality of grid points on the user interface, wherein each of the grid points defines a center of rotation for the image receiving area located at the respective grid point.

15. The computer program product of claim 14, wherein the user interface comprises at least one control configured to allow the user to vary the first tilt angle or the second tilt angle.

16. The computer program product of claim 14, wherein the first tilt angle and the second tilt angle have substantially the same angle.

17. The computer program product of claim 14, wherein the first tilt angle and the second tilt angle have different angles.

18. The computer program product of claim 14, wherein the first tilt angle and the second tilt angle define image rotations toward the same direction.

19. The computer program product of claim 14, wherein the first tilt angle and the second tilt angle define image rotations toward opposite directions.

20. The computer program product of claim 14, wherein the first group of image receiving areas is positioned in a row or a column in the user interface.

\* \* \* \* \*